(12) United States Patent
Kostadinov et al.

(10) Patent No.: US 12,098,782 B2
(45) Date of Patent: Sep. 24, 2024

(54) TESTING CONTROL VALVES IN THE FIELD

(71) Applicant: Dresser, LLC, Houston, TX (US)

(72) Inventors: Vladimir Dimitrov Kostadinov, Sharon, MA (US); Arkady Khasin, Acton, MA (US)

(73) Assignee: Dresser, LLC, Houston, TX (US)

( * ) Notice: Subject to any disclaimer, the term of this patent is extended or adjusted under 35 U.S.C. 154(b) by 274 days.

(21) Appl. No.: 17/504,816

(22) Filed: Oct. 19, 2021

(65) Prior Publication Data

US 2023/0122668 A1    Apr. 20, 2023

(51) Int. Cl.
*F16K 37/00*    (2006.01)
(52) U.S. Cl.
CPC ............... *F16K 37/0083* (2013.01)
(58) Field of Classification Search
CPC .................................. F16K 37/0083
USPC ..................................................... 73/168
See application file for complete search history.

(56) References Cited

U.S. PATENT DOCUMENTS 7,114,511 B2 *  10/2006  Lull ................... G05B 5/01
                                                137/553
2018/0142807 A1 *  5/2018  Schoonover ........ F16K 37/0083

* cited by examiner

*Primary Examiner* — Walter L Lindsay, Jr.
*Assistant Examiner* — Philip T Fadul
(74) *Attorney, Agent, or Firm* — Paul Frank + Collins P.C.

(57) ABSTRACT

A controller is configured to perform in-situ testing on a control valve. These configurations can generate a signal that changes position of a closure member in the valve during operation of a process. These changes exercise components of the valve for a short period of time. This testing may result in data that can indicate whether the device is operating properly or may be in need of maintenance or repair.

20 Claims, 10 Drawing Sheets

TESTING CONTROL VALVES IN THE FIELD

BACKGROUND

Flow controls operate in myriad applications. Control valves are a type of flow control that find use in industrial facilities, including as part of process lines. Designs for these devices are meant to accurately regulate flow to meet process parameters. It follows that accuracy issues with control valves may disrupt processes in a way that lower yields or reduces quality. In large, industrial operations, these problems may lead to significant expense due to downtime necessary to troubleshoot and repair or replace the problematic device(s). Operators find it difficult, however, to test control valves in the field because any test that induces movement may adversely affect flow through the device and, ultimately, disrupt the process.

SUMMARY

The subject matter of this disclosure relates to improvements to tests and diagnostics for control valves. Of particular interest are embodiments of a controller that can perform in-situ testing to exercise components on flow control devices. These embodiments may implement partial stroke testing (or "PST") that triggers movement of, for example, a closure member on the valve assembly. The result is data that describes or defines the movement. Analysis of this data can help operators diagnose potential failures or problems on the valve assembly, like obstruction (or sticking) of the closure member, jams of the piston cylinder or of the valve stem, clogs in air inlets or air outlets, or broken components (e.g., springs, valve stem, etc.). As noted herein, the embodiments may employ a test shape that defines setpoint(s) for control valves. Parameters may define features of the test shape. In one implementation, these parameters may have values so that movement on the valve assembly commensurate with the test shape causes the most advantageous amount of movement but with minimal, if any, impact on process parameters. This feature is beneficial because it largely prevents any adverse effects on the underlying process.

DRAWINGS

Reference is now made briefly to the accompanying drawings, in which.

Figure 1:
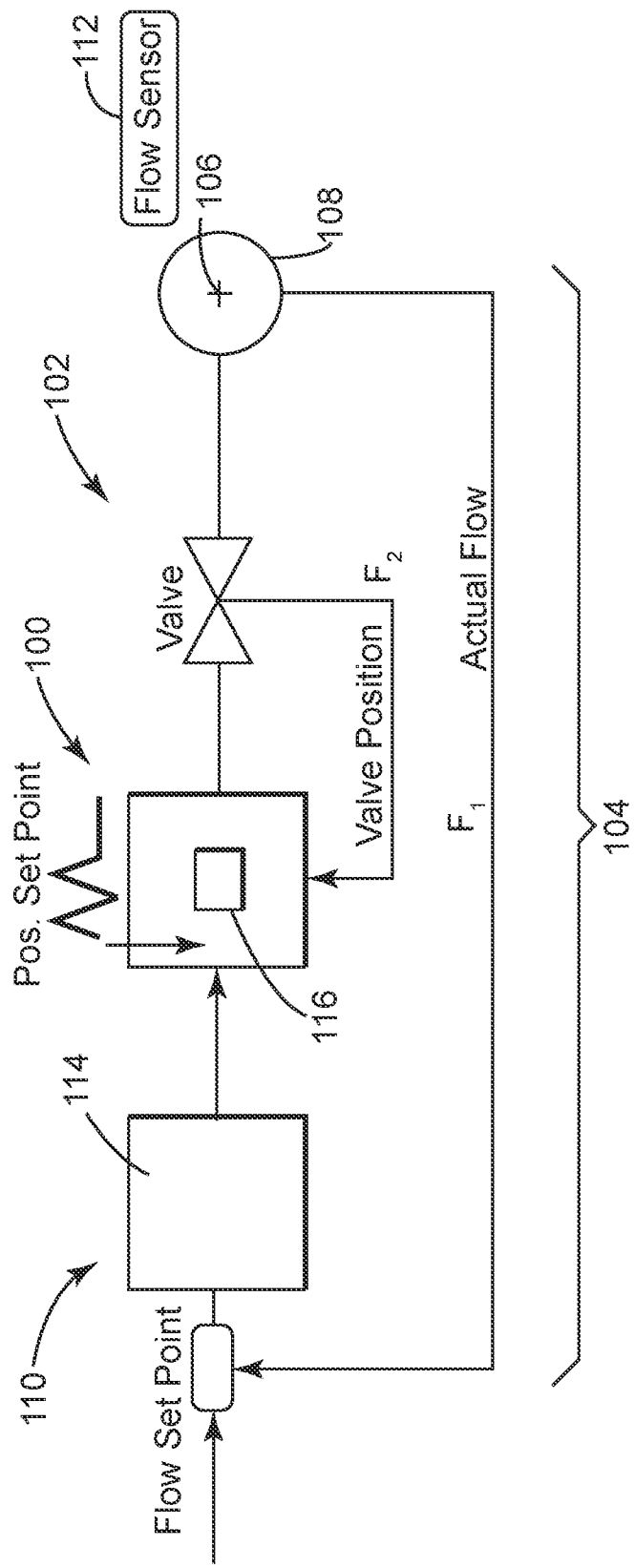
FIG. 1 depicts a schematic diagram of an exemplary embodiment of a controller.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments may find use on valves, including control valves, that have components that do not move for long periods of time. Operators can use the designs herein to evaluate readiness of these components. For control valves, this feature may determine whether the component sticks or moves in a way that indicates underlying damage that can frustrate operation down the road. Other embodiments are with the scope of this disclosure.

FIG. 1 depicts a schematic diagram of an example of a controller 100. This example is resident on a valve assembly 102 that is part of a process line 104 that may distribute material 106 through conduit 108 as part of a process. A process control system 110, or distributed control system or "DCS," with a sensor unit 112 and a process controller 114 may manage this process. In one implementation, the controller 100 may have operating hardware 116 that communicates with the process controller 114.

At a high level, the controller 100 may be configured to perform certain diagnostics or in-situ testing in the field. These configurations may execute onboard test procedures that have very little, if any, impact on parameters or conditions of the underlying process(es). This feature is beneficial because it allows operators to collect valuable device-level operating data without fear of diminishing throughput, introducing quality issues, or more generally disrupting operation of their process lines.

The valve assembly 102 may be configured to maintain flow to meet requirements of the process. These configurations may embody pneumatic and electric control valves. The process line 104 may find use in large facilities, like those found in chemical, refinery, or resource recovery operations. Material 106 may embody different "phases," including fluid (e.g., liquids or gasses); although solid or solid-fluid mixes may persist as well. Often the facility will leverage integrated networks of conduit 108, which are typically pipes or pipelines that allow material 106 to flow from point-to-point within the facility. These pipes may comprise materials that comport with operating conditions for the process, including high pressures or high flow rates. Likewise, the materials may accommodate for any caustic or hazardous nature of material 106.

The DCS 110 may be configured to manage the distribution of material 106. These configurations may include a feedback loop $F_1$ that provides information about process parameters. The sensor unit 112 may include devices that generate a signal S; typically, the signal S reflects values for flow rate, temperature, pressure, or material quantity or level, among others. The process controller 114 may process the sensor signal S to generate a command signal C that it delivers to the controller 100. The command signal C may identify a setpoint for the valve assembly 102 that will result in appropriate flow of material 106 into the process line 104.

The operating hardware 116 may be configured to operate the valve assembly 102 to maintain this setpoint. Like the DCS 110, these configurations may also leverage a feedback loop $F_2$, for example, one with a position sensor that provides information about the position P of the valve assembly 102. The position P may assume a fully-open position (or 100%) that allows maximum flow through the valve assembly 102. A fully-closed position (or 0%), on the other hand, may correspond with a minimum flow, or effectively where the valve assembly 102 prevents flow altogether. The position P may also assume various other configurations between the open position and the closed position, as desired.

The operating hardware 116 may also be configured to perform a test that exercises components on the valve assembly 102. These configuration may generate a valve movement signal that changes position P of the valve assembly 102. This valve movement signal may, for example, manipulate setpoint values for the device or modify or regulate inputs to the valve assembly 102, like instrument air, current, or voltage, among others. These changes may increase or decrease the setpoint over a pre-determined time period according to a "test shape." The test shape may have a wave form, like a sinusoidal wave, cosinusoidal wave, or square wave. The wave form may also be triangular, as desired. In one implementation, the integral of the test shape over the pre-determined time period is within certain pre-defined limits, for example, within ±10% of the process setpoint.

Changes in the setpoint (e.g., according to the wave form) may change the position P of the valve assembly 102, effectively "exercising" the valve assembly 102 over a short period of time. These exercises are useful because they generate valuable data about operability of the components on the valve assembly 102, particularly in cases where the components may remain static (or in the same position P) for long or extended periods of time. Data from the position sensor may indicate, for example, that the valve assembly 102 does not achieve its desired setpoint. The controller 100 or DCS 110 may flag this issue, for example, by generating an alert to an operator that the device may require further analysis, monitoring, maintenance, or repair, as desired. Notably, the test shape may be configured so that the changes in position P do not impact the underlying process parameters, for example, flow rate, temperature, or pressure. The DCS 110 may abort the test in response to feedback to the contrary.

Figure 2:
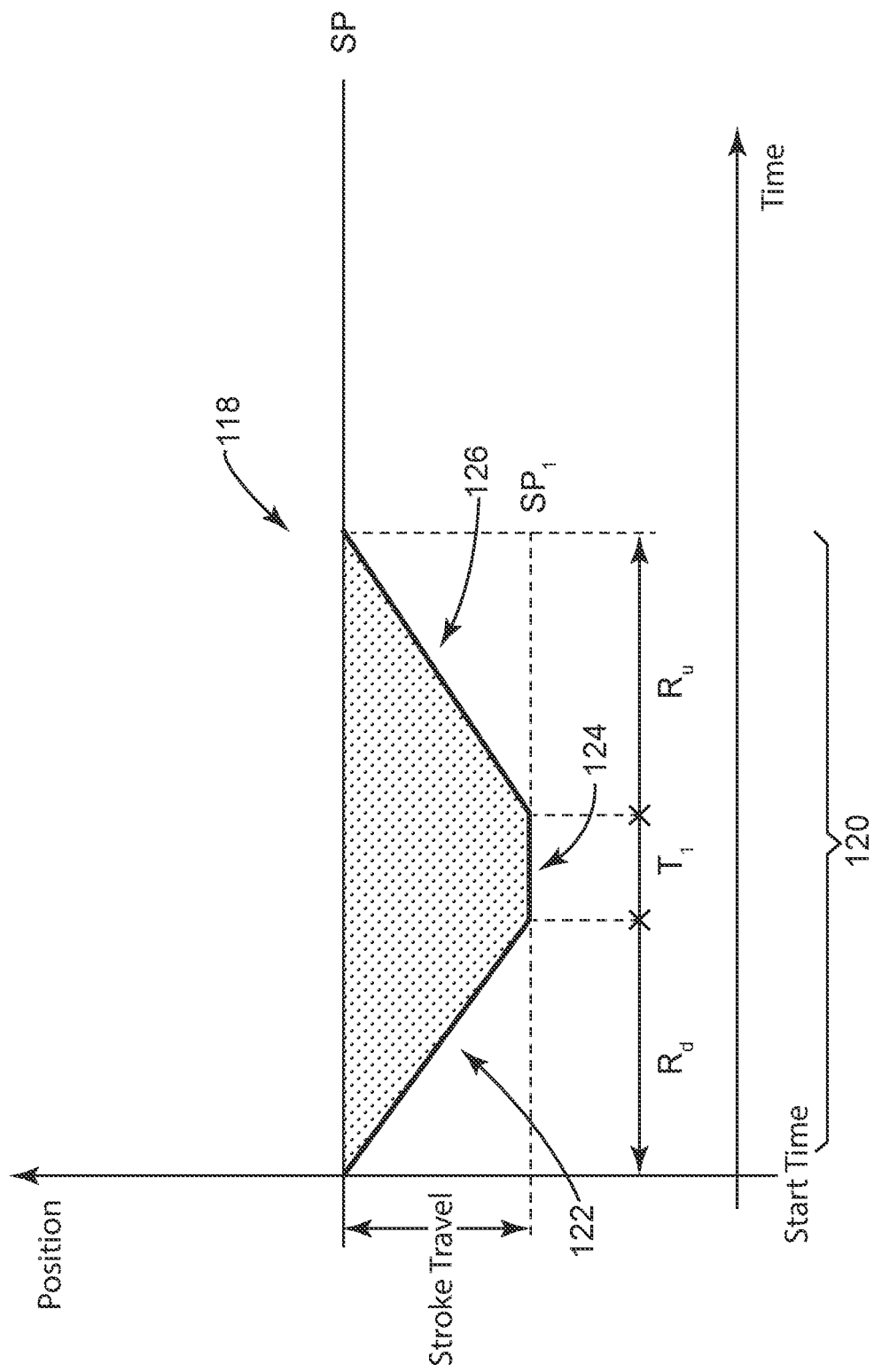
FIG. 2 depicts a plot of a test shape for use on the controller of FIG. 1.

FIG. 2 depicts an example of a test shape 118 for use by the controller 100 of FIG. 1. This example defines a pattern 120 for the setpoint over a pre-determined time period. As shown, the pattern 120 may have a ramp down portion 122, where the setpoint changes from an initial setpoint SP to a first setpoint $SP_1$ that is less than the initial setpoint SP. This change may occur over a ramp down time $R_d$. A stationary portion 124 or "pause" may follow the downward stroke. This pause maintains the first setpoint $SP_1$ for a time $T_1$. Following this pause, the pattern 120 may include a ramp up portion 126, where the setpoint changes from the first setpoint $SP_1$ back to the initial setpoint SP. This change may occur over a ramp up time $R_u$. In use, the pattern 120 may result in changes in position P on the valve assembly 102. The position sensor may measure these changes or "stroke travel." In one implementation, the ramp down portion 122 may result in stroke travel that closes the valve assembly 102 from 10% to 5%. The stroke travel commensurate with the ramp up portion 126 may open the valve assembly 102 from 5% to 10%.

The stroke travel that results from the pattern 120 may impact flow from the valve assembly 102. For example, the pattern 120 may result in a reduction in flow because the test shape 118 changes the setpoint in a way that closes the valve assembly 102. The impact of this reduction may correspond with a first area A that the pattern 120 forms in the test shape 118. For valves with a linear characterization, where a linear relationship exists between valve position P and flow coefficient $C_v$, the impact on flow may be proportional to the first area A, as defined in Equation (1) below:

$$I \cong ST \times \left(\frac{R_d}{2} + T + \frac{R_u}{2}\right), \quad \text{Equation (1)}$$

where I is impact, ST is stroke travel, $R_d$ is ramp down time, $R_u$ is ramp up time, and T is the pause time. As noted above, the test shape 118 may be configured to reduce or minimize the impact I on flow from the valve assembly 102 that might trigger the DCS 110 to abort the test.

Figure 3:
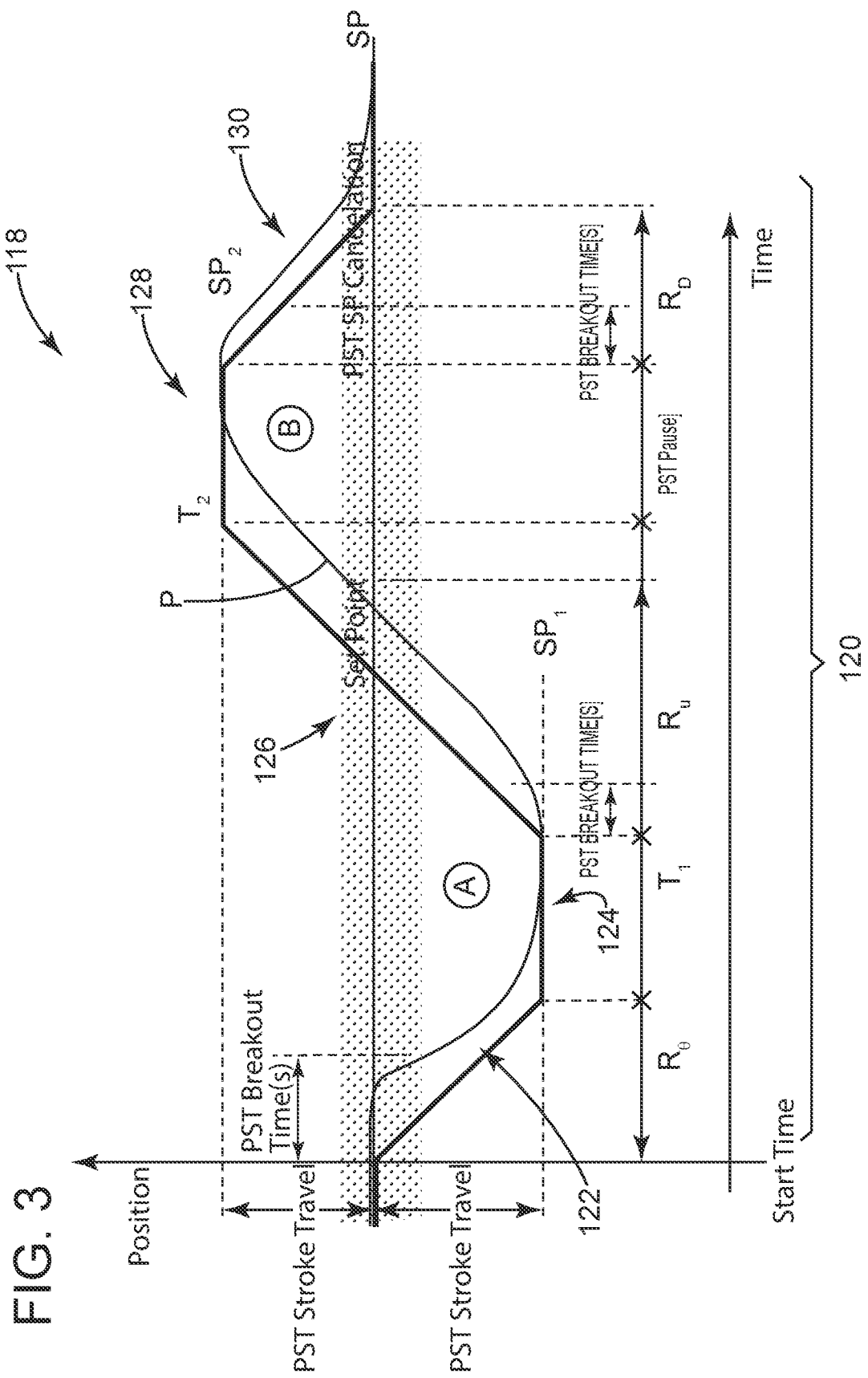
FIG. 3 depicts a plot of a test profile for use on the controller of FIG. 1.

FIG. 3 depicts another example of the test shape 118. This example overlays a plot P of actual position for the valve assembly 102 that may result from the pattern 120. As shown, the ramp up portion 126 extends to a second setpoint $SP_2$ that is greater than the initial setpoint SP. A second stationary portion 128 may follow the upward stroke. This pause maintains the second setpoint $SP_2$ for a time $T_2$. The pattern 120 may further include a ramp down portion 130 to the initial setpoint SP. In use, the ramp up portion 126 may result in stroke travel that opens the valve assembly 102 from 5% to 15%, while the ramp down portion 130 cause stroke travel that closes the valve assembly 102 from 15% to 10%. This example is beneficial because the pattern 120 may result in larger movements on the valve assembly 102 (e.g., the stroke travel that results in the ramp up from $SP_1$ to $SP_2$). These larger movements may generate more accurate and reliable data about operation of the device because the components are moving farther for a longer relative period of time.

The stroke travel in this example may also impact flow from the valve assembly 102. As shown, the pattern 120 may result in both a reduction in flow (as the valve assembly closes) and an increase in flow (as the valve assembly opens). The impact of these changes may correspond with the first area A (reduction in flow) and a second area B (increase in flow) that the pattern 120 forms in the test shape 118. Adjusting the pattern variables (including pauses $T_1$, $T_2$ and ramp times $R_d$, $R_u$) to make the test shape 118 symmetrical (as between area A and area B) can minimize or even eliminate the impact of the stroke travel because the reduction in flow becomes the same or equal to the increase in flow over the short period of time of the test.

Figure 4:
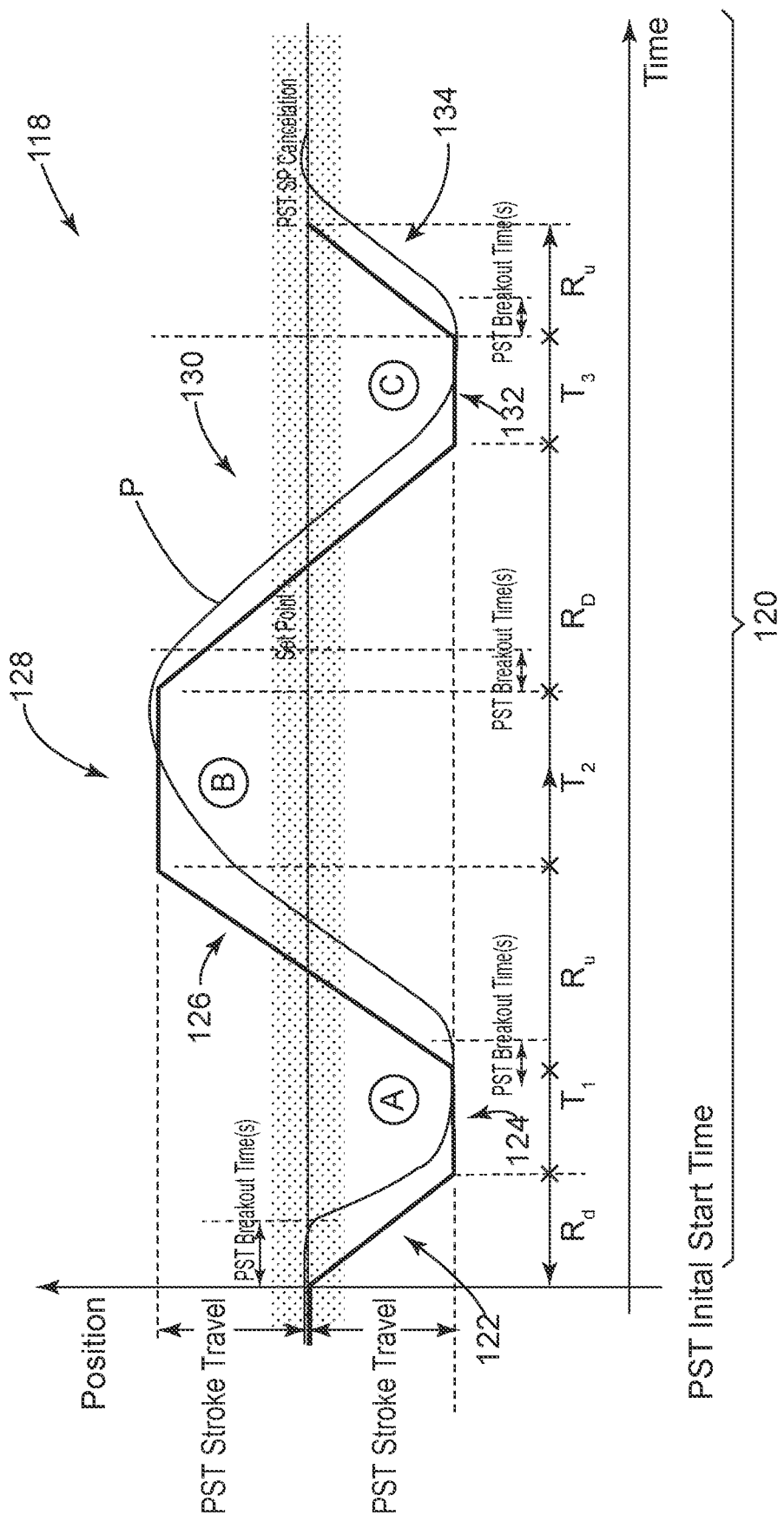
FIG. 4 depicts a plot of a test profile for use on the controller of FIG. 1.

FIG. 4 depicts an example of the test shape 118 as well. Here, the ramp down portion 130 extends to a third setpoint $SP_3$ that is less than the initial setpoint SP. The pattern 120 may maintain this third setpoint $SP_3$ at a third stationary portion 132 for a time $T_3$. The pattern 120 may also include a second ramp up portion 134 to the initial setpoint SP. In use, the ramp down portion 130 may result in downward stroke travel that closes the valve assembly 102 from 15% to 5%. The ramp up portion 134 may then open the valve assembly 102 from 5% to 10%. As noted above, adjusting the pattern variables (including pauses $T_1$, $T_2$ and ramp times $R_d$, $R_u$) can minimize the impact of the stroke travel, for example, as between the reduction in flow commensurate with the first area A and a third area C and the increase in flow commensurate with the second area B. In one implementation, these adjustments may be determined in accordance with Equations (2), (3), and (4) below, $$I_d = I_p,$$ Equation (2)

$$I_d \cong ST_d \times (R_d + 2 \times T_d + R_u),$$ Equation (3)

$$I_p \cong ST_U \times \left(\frac{R_u}{2} + T_u + \frac{R_d}{2}\right),$$ Equation (4)

where $I_d$ is the impact of the reduction in flow (areas A, C), $I_p$ is the impact of the increase in flow (area B), $ST_d$ is stroke travel downward, STu is stroke travel upward, $R_d$ is ramp down time, $R_u$ is ramp up time, $T_d$ is the pause time at each of the first setpoint $SP_1$ and the third setpoint $SP_3$, and $T_u$ is the pause time at the second setpoint $SP_2$.

Figure 5:
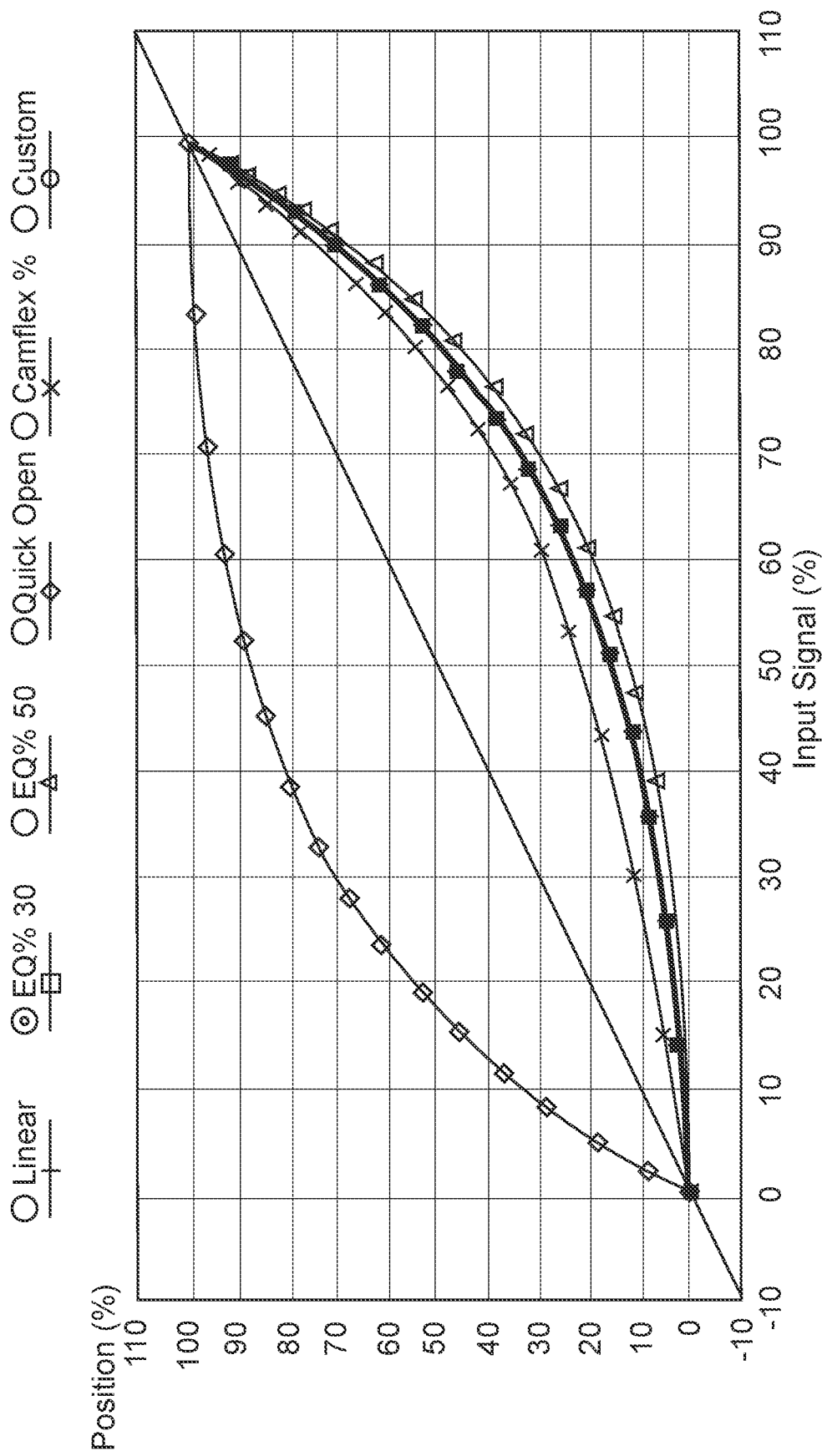
FIG. 5 depicts a plot of characterization curves for a control valve.

FIG. 5 depicts a plot of characterization curves for the valve assembly 102. Some of the characterization curves correspond with a non-linear relationship between valve position P and flow coefficient $C_v$. This relationship may lead to different flow rates because the actual position of the valve assembly 102 is different from the setpoint of the test shapes 118. As noted above, adjusting the pattern values may provide the pattern 120 to achieve the desired test shape 118 contemplated herein.

Figure 6:
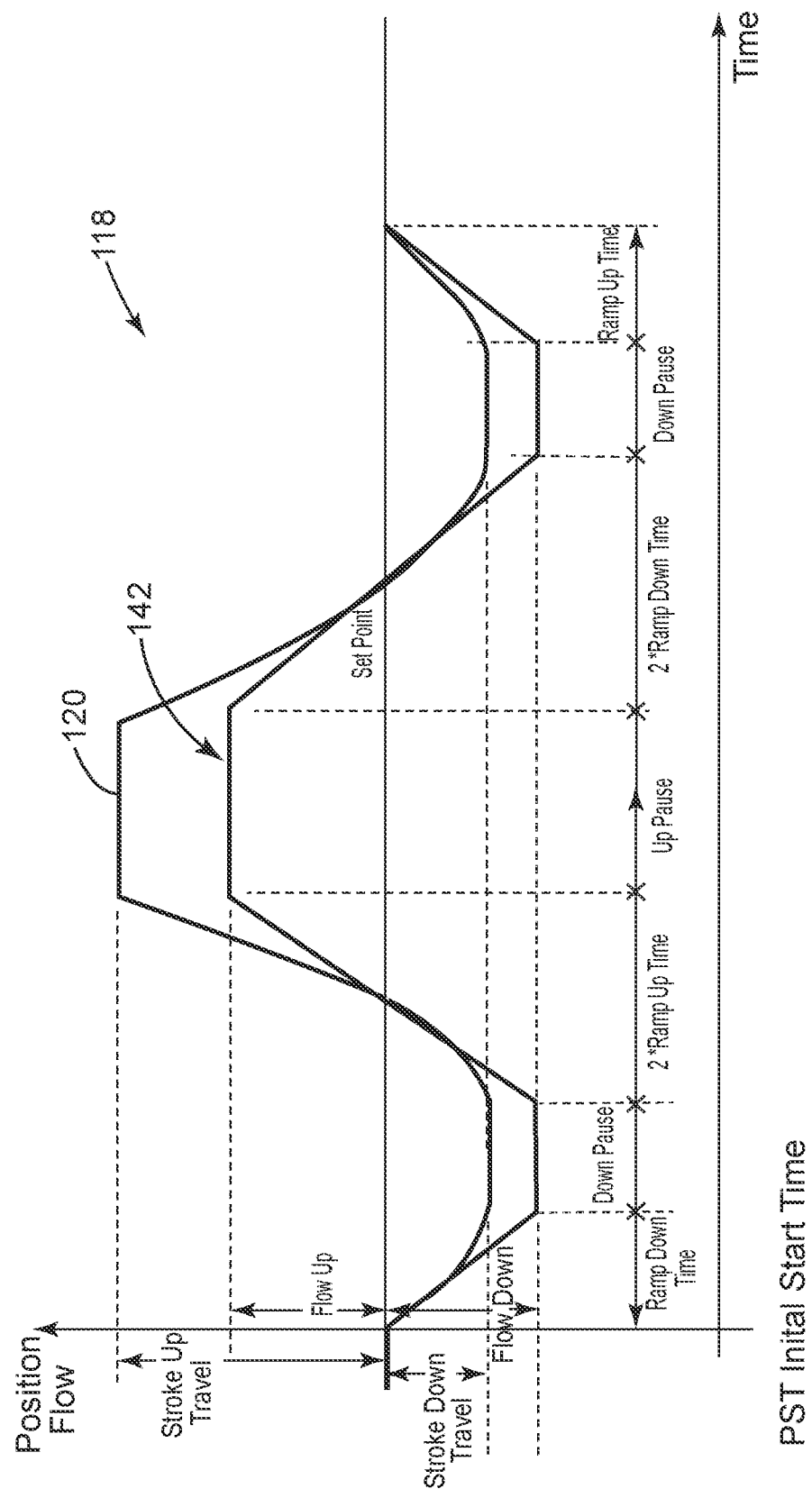
FIG. 6 depicts a plot of a test profile for use on the controller of FIG. 1.

FIG. 6 depicts an example of the test shape 118. This example compares a pattern 142 for desired flow setpoint to the pattern 120 for use with the valve assembly 102 having a non-linear characterization. The pattern 120 may result from adjusting pattern parameters, including the slope of the ramp down portions or the ramp up portions, the setpoint(s) ($SP_1$, $SP_2$, or $SP_3$), or the pause times ($T_1$, $T_2$, or $T_3$). Values for these parameters may depend on individual performance of the valve assembly 102. This performance may vary from valve-to-valve for a variety of reasons, including (a) instrument air flow or other restrictions on capacity of valve actuation, (b) unbalanced forces among components of the valve assembly 102, (c) mechanical design(s) for the valve assembly 102, (d) failures, problems, or other related issues that can impact performance of the valve assembly 108. One or more of these factors may cause the position P of the valve assembly 102 to deviate, even slightly, from the setpoint(s) the pattern 120 defines on the test shape 118.

Figure 7:
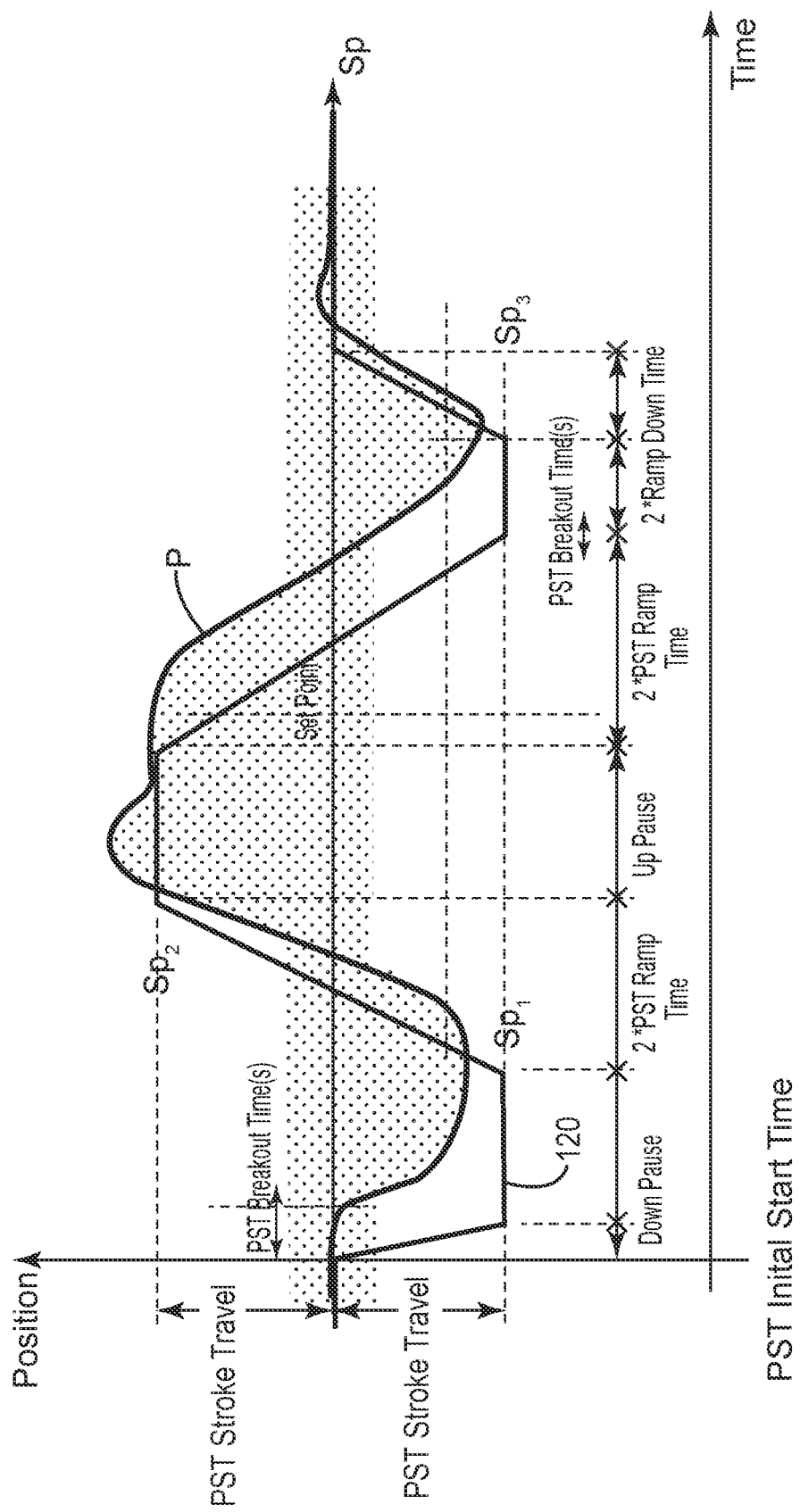
FIG. 7 depicts a plot of a test profile for use on the controller of FIG. 1.

FIG. 7 depicts an example of the test shape 118. The pattern 120 incorporates adjustments made to pattern parameters to accommodate for factors affecting performance of the valve assembly 102, like those discussed above. The error between the setpoint (of the pattern 120) and the actual position P may be calculated according to Equation (5) below:

$$E(t) = SP(t) - P(t),$$ Equation (5)

where E is the error, SP is the setpoint, and P is the actual position. The impact (I) on flow from this non-symmetrical performance corresponds with an integral of the error E, for example, according to Equation (6) below:

$$I = \int_{Start\ time}^{End\ time} E(t) dt,$$ Equation (6)

In one implementation, the operating hardware 116 may be configured to calculate the impact during testing of the device. These configurations may compensate for the impact, for example, by adding additional ramp up portions or ramp down portions to the end of the pattern 120. These corrections may minimize disturbances in flow from the valve assembly 102. In one example, the operating hardware 116 may store data that correspond with previous test results. This data may serve to inform necessary corrections that the operating hardware 116 can apply to future tests.

Figure 8:
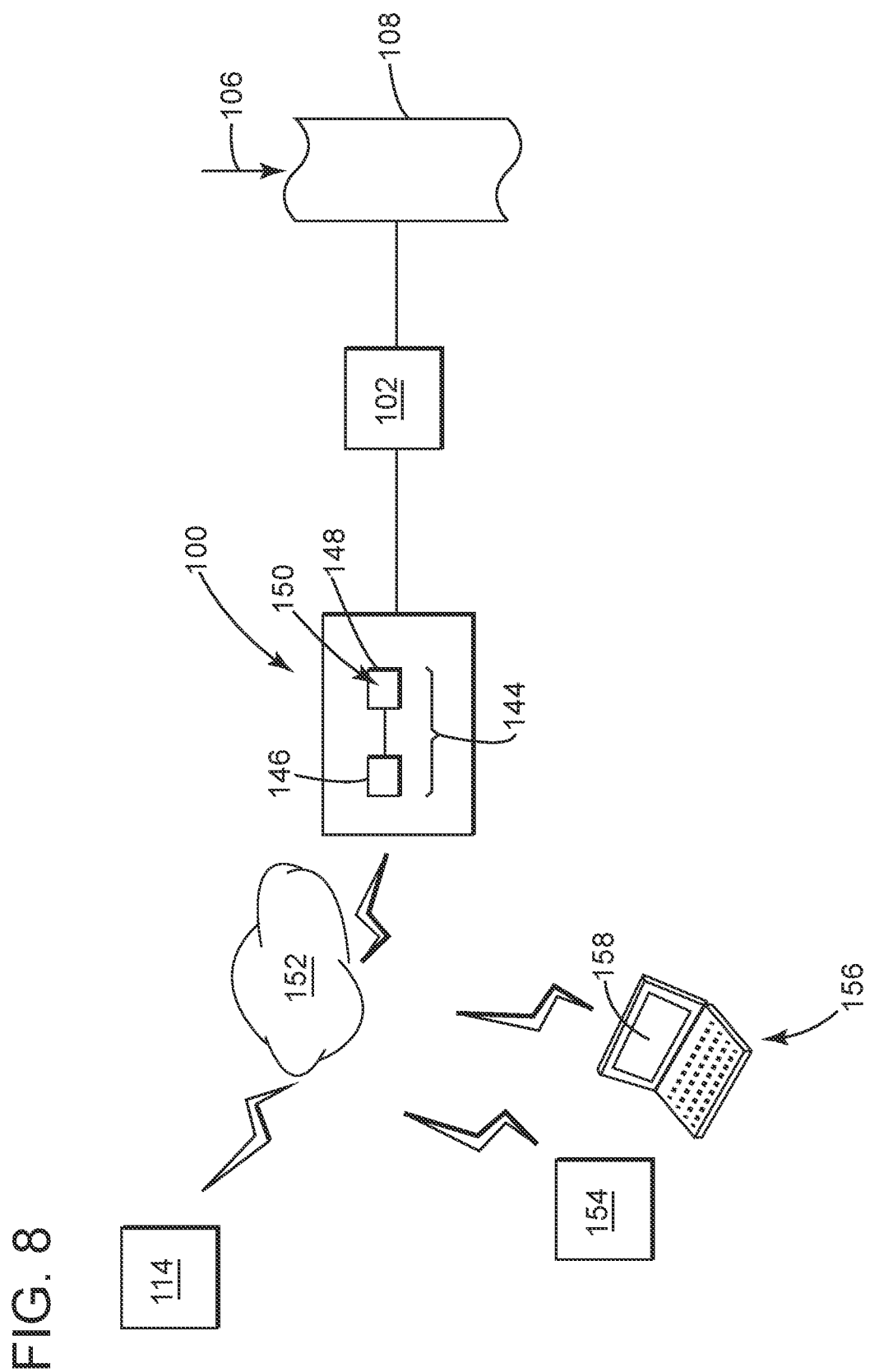
FIG. 8 depicts a plot of a test profile for use on the controller of FIG. 1.

FIG. 8 depicts an example of the controller 100. This example may include a processing unit 144 that has a processor 146 that couples with memory 148. Executable instructions 150 may be stored in memory 148 in the form of software, computer programs, firmware, and the like. The controller 100 may connect to a network 152 that transfers data, information, and signals among the connected components. The transfer may occur by way of wired protocols (e.g., 4-20 mA, Foundation Fieldbus, etc.) or wireless protocols, many of which find use in a plant or factory automation environments. As shown, the DCS 110 may include a process management server 154 that may also have processor and memory of its own, the latter for storing data and executable instructions in the form of software or computer programs. These software programs may allow operators to modify the pattern parameters for pattern 120 or perform data diagnostics and health monitoring. Operators may access the software on a terminal 156, for example through a user interface 158.

Figure 9:
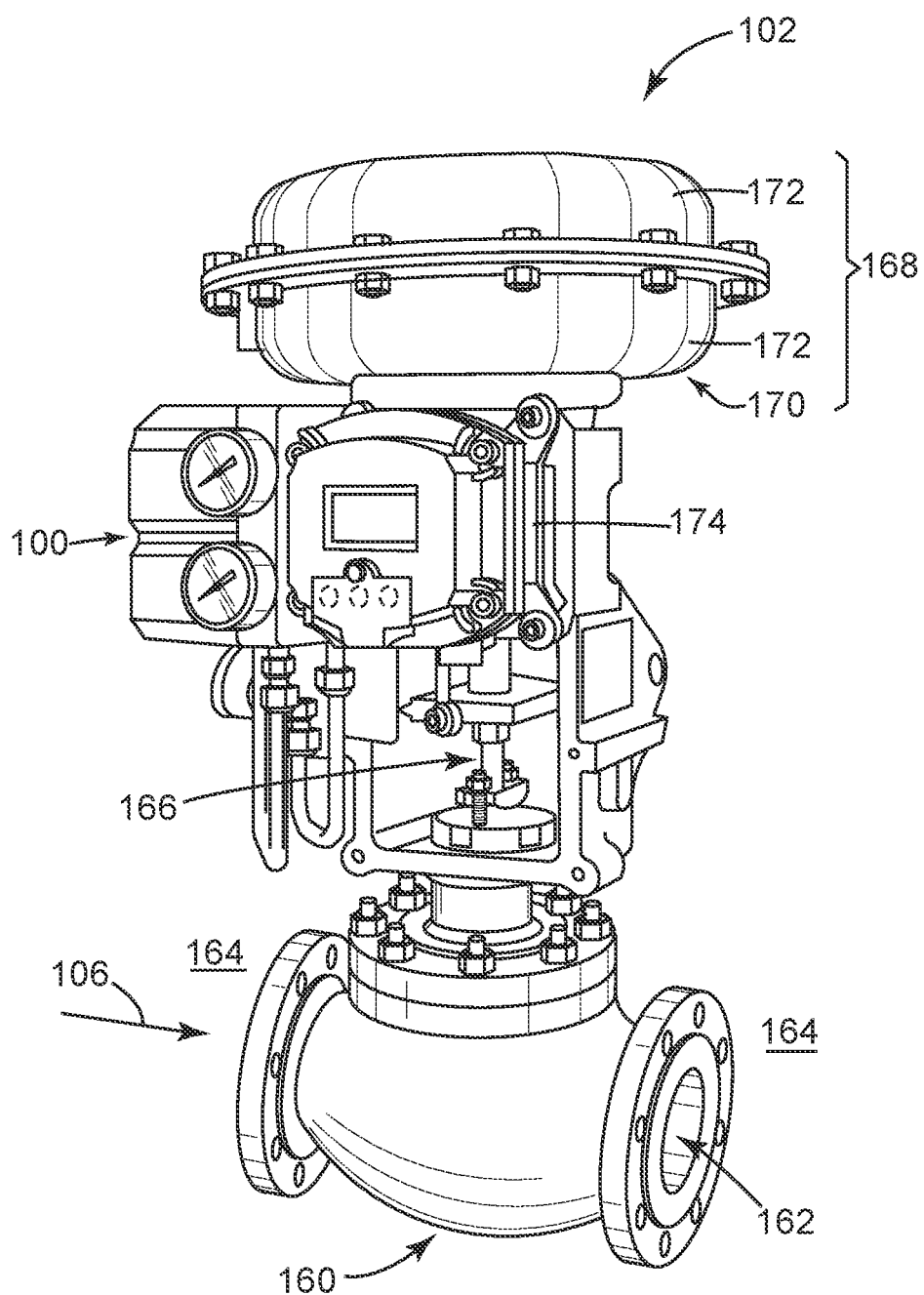
FIG. 9 depicts a perspective view of exemplary structure for the controller of FIG. 1.

FIG. 9 depicts a perspective view of exemplary structure for the valve assembly 102. This structure may include a valve body 160 that forms a flow path 162 with flanged, open ends 164. Valve components like a seat and a closure member may reside inside of the body 160 (and, thus, are hidden in the present view). The closure member may embody a plug, a ball, a butterfly valve, or like implement. The device may include a valve stem 166 that connects the closure member with an actuator 168. For pneumatic devices, the actuator 168 may include a bulbous housing 170, typically with two pieces 172 that clamp about the edges to entrap a diaphragm (not shown) round the periphery. As noted herein, the actuator 168 can turn pressurized air into mechanical load that modulates position of the closure member relative to the seat. The controller 100 may fasten to a bracket 174 that is part of the valve assembly 102. Fasteners such as bolts are useful for this purpose.

Figure 10:
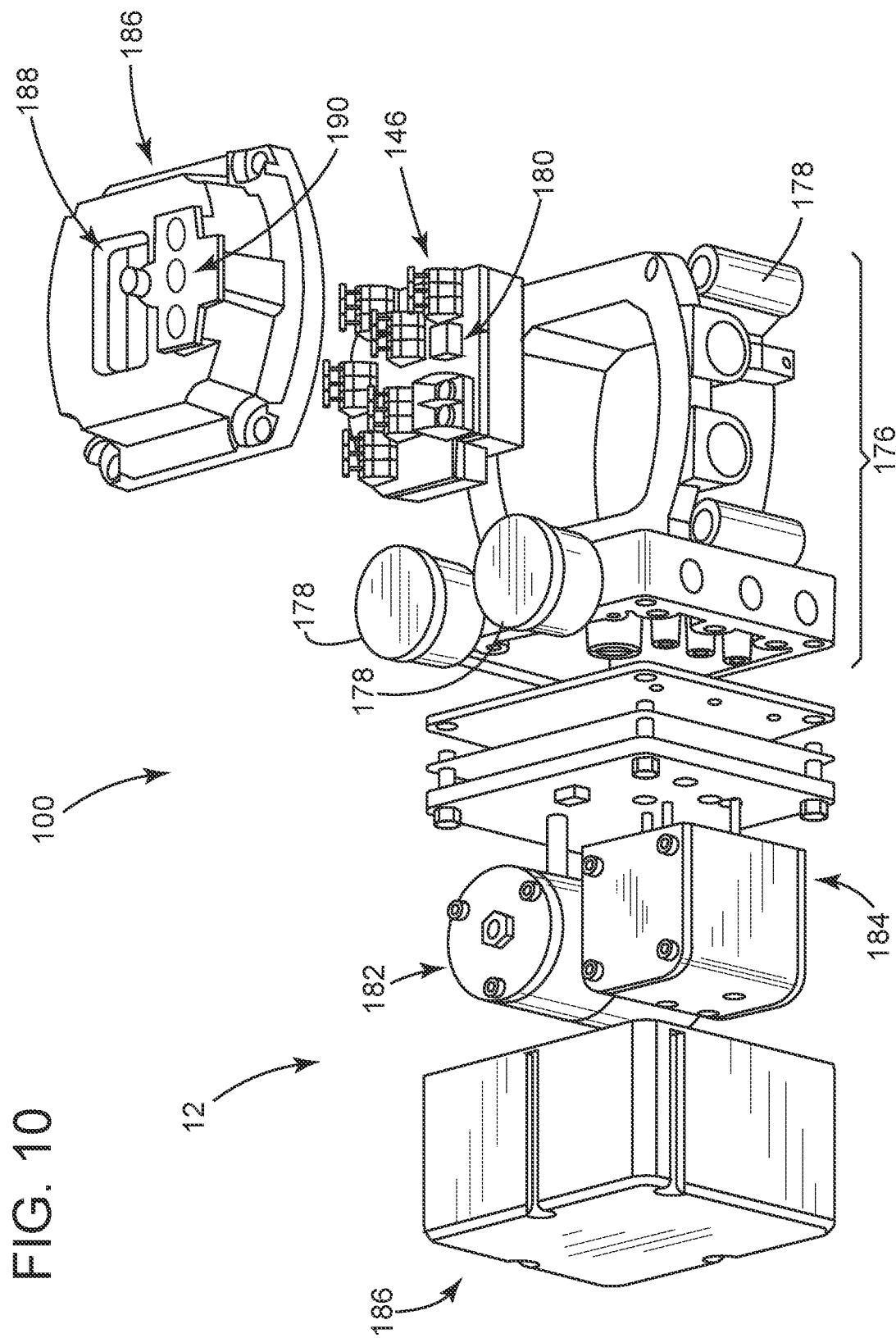
FIG. 10 depicts a perspective view of exemplary structure for a control valve.

FIG. 10 depicts a perspective view of exemplary structure for the controller 100 in exploded form. This structure may include a manifold 176 having a manifold body 178, typically machined or formed metal, plastic or composite. The device may include one or more boards 180, which can have components for the processing unit 146 disposed thereon. Other hardware may include a current-to-pressure converter 182 and a relay 184. The components 182, 184 work together to deliver a actuator signal (for example, instrument air or current) to the actuator 168. In pneumatic devices, the actuator signal pressurizes the inside of the housing 170, which acts against the diaphragm. Changes in the actuator signal may increase or decrease pressure inside of the housing 170, which in turn affects the position of the closure member. For example, a reduction in pressure (below the pressure of material 106) will allow the closure member to move away from the seat. An increase in pressure (above the pressure of material 106), on the other hand, may force the closure member closer to the seat. In one implementation, the operating hardware 116 may deliver the pneumatic signal to the actuator 120 according to the test shapes 118 noted herein. The test shape 118 may result in different positions for the closure member (relative to the seat).

As also shown, the controller 100 may hardware to protect the control components. This hardware may include an enclosure, shown as covers 186 in this example. The covers 186 may secure to the manifold body 176 to protect the control components from conditions that prevail in the environment surrounding the valve assembly 102. One of the covers 186 may incorporate a display 188 and a push-button input device 190 that may operate as the primary local user interface to allow an end user (e.g., technician) to interact with the controller 100. This feature may be important for regular maintenance, configuration, and setup, for example, to allow the end user to exit from valve operating mode and step through a menu structure to manually perform functions such as calibration, configuration, and monitoring. In one implementation, the controller 100 may further include one or more gauges 190 that can provide an indication of the flow conditions (e.g., pressure, flow rate, etc.) of the fluid that the controller 100 uses to operate the valve assembly 102.

In view of the foregoing, the improvements herein provide on-sight testing of control valves and like flow components. The embodiments are useful to exercise components, like the closure member, relay, and current-to-pressure converter, to ensure they are in proper working. The technical effect is to generate valuable data, including position data for the valve assembly. This data may serve as a basis for diagnostics on the device.

The examples below include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
a closure member;
an actuator coupled with the closure member; and
a controller coupled with the actuator and operative to deliver an actuator signal to the actuator according to a command signal that defines a first value for a setpoint for a process,
wherein the controller is further operative to run a test during operation of the process, and
wherein, during the test, the controller delivers the actuator signal according to a test shape that defines a second value for the setpoint independent of the command signal and causes the closure member to move to positions on one or both sides of the first value for the setpoint.

2. The valve assembly of claim 1, wherein, during the test, the closure member moves first to a position below the setpoint and then moves to a position above the setpoint.

3. The valve assembly of claim 1, wherein, during the test, the closure member moves first to a position above the setpoint and then moves to a position below the setpoint.

4. The valve assembly of claim 1, wherein, during the test, the closure member moves to a combination of the following,
a pair of positions above the setpoint, and
a position below the setpoint.

5. The valve assembly of claim 1, wherein, during the test, the closure member moves to a combination of the following,
a pair of positions below the setpoint, and
a position above the setpoint.

6. The valve assembly of claim 1, wherein the positions of the closure member include a maximum and a minimum, and wherein the maximum has an absolute value that is the same as the absolute value of the minimum.

7. The valve assembly of claim 1, wherein the positions of the closure member include a maximum and a minimum, and wherein the maximum has an absolute value that is different from the absolute value of the minimum.

8. The valve assembly of claim 1, wherein the test shape is a time-based shape for a pre-determined time period.

9. The valve assembly of claim 1, wherein the wherein the test shape is a time-based shape for a pre-determined time period that has an integral over the pre-determined time period that is within a pre-defined limit.

10. The valve assembly of claim 1, wherein the test shape is a time-based shape for a pre-determined time period that is sinusoidal.

11. The valve assembly of claim 1, wherein test shape is a time-based shape for a pre-determined time period that is a square wave.

12. The valve assembly of claim 1, wherein the test shape is a time-based shape for a pre-determined time period that is triangular.

13. A controller, comprising:
components operative to generate an actuator signal to operate an actuator according to a command signal that defines a first value for a setpoint for a process; and
computing components operative to run a test during operation of the process,
wherein, during the test, the components generate the actuator signal according to a test shape that result in variations in the actuator signal independent of the command signal over a pre-determined time period, and
wherein the variations in the actuator signal result in positions for a closure member of a valve that are found on one or both sides of the position of the closure member that corresponds with the first value for the setpoint.

14. The controller of claim 13, wherein the computing components are operative to hold the actuator signal at a value above the setpoint.

15. The controller of claim 13, wherein the computing components are operative to hold the actuator signal at a value below the setpoint.

16. The controller of claim 13, wherein the computing components are operative to hold the actuator signal at a value above the setpoint and a value below the setpoint during the pre-determined time period.

17. The controller of claim 13, wherein the test shape is a time-based shape during the pre-determined time period.

18. A method, comprising:
on a value assembly having a controller that provides an actuator signal according to a command signal that defines a first value for a setpoint for a process to an actuator to set position of a closure member relative to a seat on a valve:

during operation of the valve assembly as part of the process, changing the actuator signal independent of the command signal according to a test shape to manipulate setpoint values so as to cause the closure member to perform consecutive movements within a pre-determined time period that reduce and increase flow through the valve assembly relative to the flow set for the process.

19. The method of claim 18, wherein the actuator signal maintains a volume flow through the valve assembly that is equivalent to the volume flow through the value assembly that occurs for the flow set for the process with the pre-determined time period.

20. The method of claim 18, wherein the actuator signal increases and decreases the setpoint according to a time-based shape that has an integral over the pre-determined time period that is within a pre-defined limit.

* * * * *